United States Patent
Djekic et al.

(10) Patent No.: US 7,463,498 B1
(45) Date of Patent: *Dec. 9, 2008

(54) APPARATUS FOR ISOLATED SWITCHING POWER SUPPLY WITH COUPLED OUTPUT INDUCTORS

(75) Inventors: Ognjen Djekic, Fremont, CA (US); Alexandr Ikriannikov, Castro Valley, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/756,972

(22) Filed: Jun. 1, 2007

Related U.S. Application Data

(63) Continuation of application No. 11/022,217, filed on Feb. 17, 2005, now Pat. No. 7,239,530.

(51) Int. Cl.
*H02M 3/335* (2006.01)
(52) U.S. Cl. ............... 363/25; 363/16; 323/222
(58) Field of Classification Search ............ 323/272, 323/282–284, 222, 350, 351; 363/16–20, 363/25, 28, 134, 71, 81, 98, 132, 80, 97
See application file for complete search history.

(56) References Cited

U.S. PATENT DOCUMENTS

| | | | |
|---|---|---|---|
| 5,177,675 A * | 1/1993 | Archer | 363/25 |
| 5,204,809 A | 4/1993 | Andresen | |
| 5,764,500 A | 6/1998 | Matos | |
| 6,018,468 A | 1/2000 | Archer et al. | |
| 6,362,986 B1 | 3/2002 | Schultz et al. | |
| 6,686,727 B2 * | 2/2004 | Ledenev et al. | 323/272 |
| 6,757,184 B2 * | 6/2004 | Wei et al. | 363/71 |
| 7,030,512 B2 * | 4/2006 | Krein | 307/77 |

OTHER PUBLICATIONS

U.S. Appl. No. 11/022,217 Office Action dated Jun. 15, 2006.
U.S. Appl. No. 11/022,217 Response to Office Action dated Jun. 15, 2006.
U.S. Appl. No. 11/022,217 Notice of Allowance.
Wong, Pit-Leong, et al., "A Novel Modeling Concept For Multi-Coupling Core Structures," Virginia Polytechnic Institute and State University, Blackburg, VA, pp. 1-7, Jan. 2001.
Wong, Pit-Leong, et al., "Investigating Coupling Inductors In The Interleaving QSW VRM," Virgina Polytechnic Institute and State University, Blackburg, VA, pp. 973-978, Jan. 2001.
Wong, Pit-Leong, et al., "Performance Improvements of Interleaving VRM's with Coupling Inductors," IEEE Transactions on Power Electronics, vol. 16, No. 4, pp. 499-507, Jul. 2001.

* cited by examiner

*Primary Examiner*—Rajnikant B Patel
(74) *Attorney, Agent, or Firm*—Lathrop & Gage LC

(57) ABSTRACT

A multiphase DC-to-DC power converter has two or more sets of input switches, each set of input switches driving primary windings of an associated transformer. Each transformer has one or two secondary windings, the secondary windings feeding power through output switches or rectifiers through an associated output inductor into a common filter. At least two of the output inductors are magnetically coupled.

24 Claims, 7 Drawing Sheets

APPARATUS FOR ISOLATED SWITCHING POWER SUPPLY WITH COUPLED OUTPUT INDUCTORS

RELATED APPLICATIONS

This application is a continuation of U.S. patent application Ser. No. 11/022,217, filed Feb. 17, 2005, now U.S. Pat. No. 7,239,530 the disclosure of which is incorporated herein by reference.

FIELD

This document relates generally to switching power converters, and particularly to transformer based, multiphase, DC-to-DC converters having coupled output inductors.

BACKGROUND

Switching DC-to-DC power converters having a multiphase coupled inductor topology are described in U.S. Pat. No. 6,362,986 to Shultz, et al., the disclosure of which is incorporated herein by reference. These converters have advantages, including reduced ripple current in the inductors and switches allowing reduced per-phase inductance or reduced switching frequency, over converters having conventional multi-phase dc-dc converter topologies. As a result, converters with magnetically coupled inductors have superior transient response without efficiency penalty compared with conventional multiphase topologies. This allows a significant reduction (>50%) in output capacitance resulting in smaller, lower cost power solutions. The switching DC-to-DC converter described in U.S. Pat. No. 6,362,986 is not ideal for large voltage step-down or step up ratios and does not provide for isolation between input and output rails.

There are many applications for DC to DC power converters where isolation between input and output rails is desirable. For example, AC power supplies and AC adapters of many devices rectify household AC current to provide a high DC voltage, driving a DC to DC converter that drives a load. Many such devices have metal parts accessible to a user, user safety requires that there be a high impedance, or electrical isolation, between either side of the AC power connection and the output power rails.

In other applications, DC to DC converters may need to provide a large voltage step-down from input to output. This step-down ratio can be achieved by cascading multiple converter stages or by using a single stage having a transformer to step down the input voltage. Transformer-based topologies are also useful to step the voltage up.

Transformer based DC-to-DC power converters between input and output rails typically have a set of input switches that convert input DC to high frequency AC current, a transformer for providing voltage step-down and/or electrical isolation while magnetically coupling AC power, and a set of output switches or rectifiers for generating the DC output.

In some DC-to-DC converters, isolation is not required but transformers are still desired in power supplies because of high step-up or step-down ratio of the voltages between input and output.

Many (not all) transformer based multiphase DC-to-DC buck-type or buck-derived power converters have output inductors. These inductors are typically not magnetically coupled to each other.

SUMMARY

A multiphase DC-to-DC power converter has two or more sets of input switches, each set of input switches driving primary windings of an associated transformer. Each transformer has one or two secondary windings, the secondary windings feeding power through output switches or rectifiers through an associated output inductor into a common output filter. At least two of the output inductors are magnetically coupled.

DETAILED DESCRIPTION OF THE EMBODIMENTS

Figure 1:
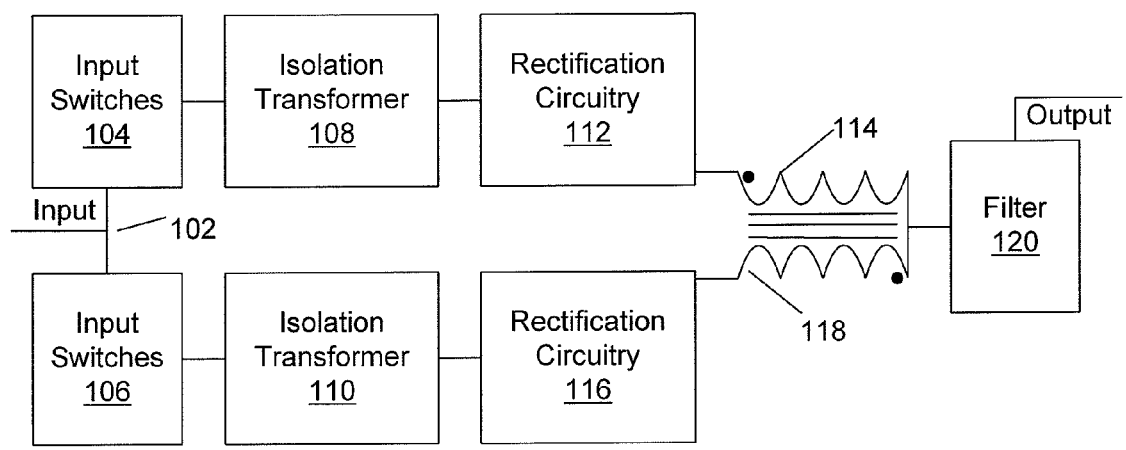
FIG. 1 is a simplified block diagram of a power converter.

A DC-to-DC power converter has an input 102. Power from the input is coupled through a first 104 and a second 106 set of input switches into primary windings of a first 108 and a second 110 isolation transformer. Each isolation transformer has at least one primary winding inductively coupled to at least one secondary winding.

The first set of input switches 104 drives the primary winding of a first 108 isolation transformer and the second set of input switches 106 is coupled to drive the primary winding of a second 110 isolation transformer. Primary windings of the first isolation transformer 108 and the second isolation transformer 110 are driven out of phase, as discussed below with reference to FIG. 4.

The secondary winding of the first isolation transformer 108 drives through first rectification circuitry 112 to a first output inductor 114. Similarly the secondary winding of the second isolation transformer 110 drives through second rectification circuitry 116 to second output inductor 118. First 114 and second 118 output inductors are magnetically coupled, and both drive a common filter 120. Filter 120 includes at least one capacitor.

Each rectification circuitry 112, 116 may use diodes to provide one-way conduction. Where high efficiency is desired at low output voltages, rectification circuitry 112, 116 typically uses active switching transistors to provide low voltage drop during conductive portions of each cycle as shown in the FIGS. 2 and 3.

A first grouping of associated input switches 104, transformer 108, rectification circuitry 112, and output inductor 114 represent a first phase of the multiphase converter. Similarly, A second grouping of associated input switches 106, transformer 110, rectification circuitry 116, and output inductor 118 represent a second phase of the multiphase converter.

Figure 2:
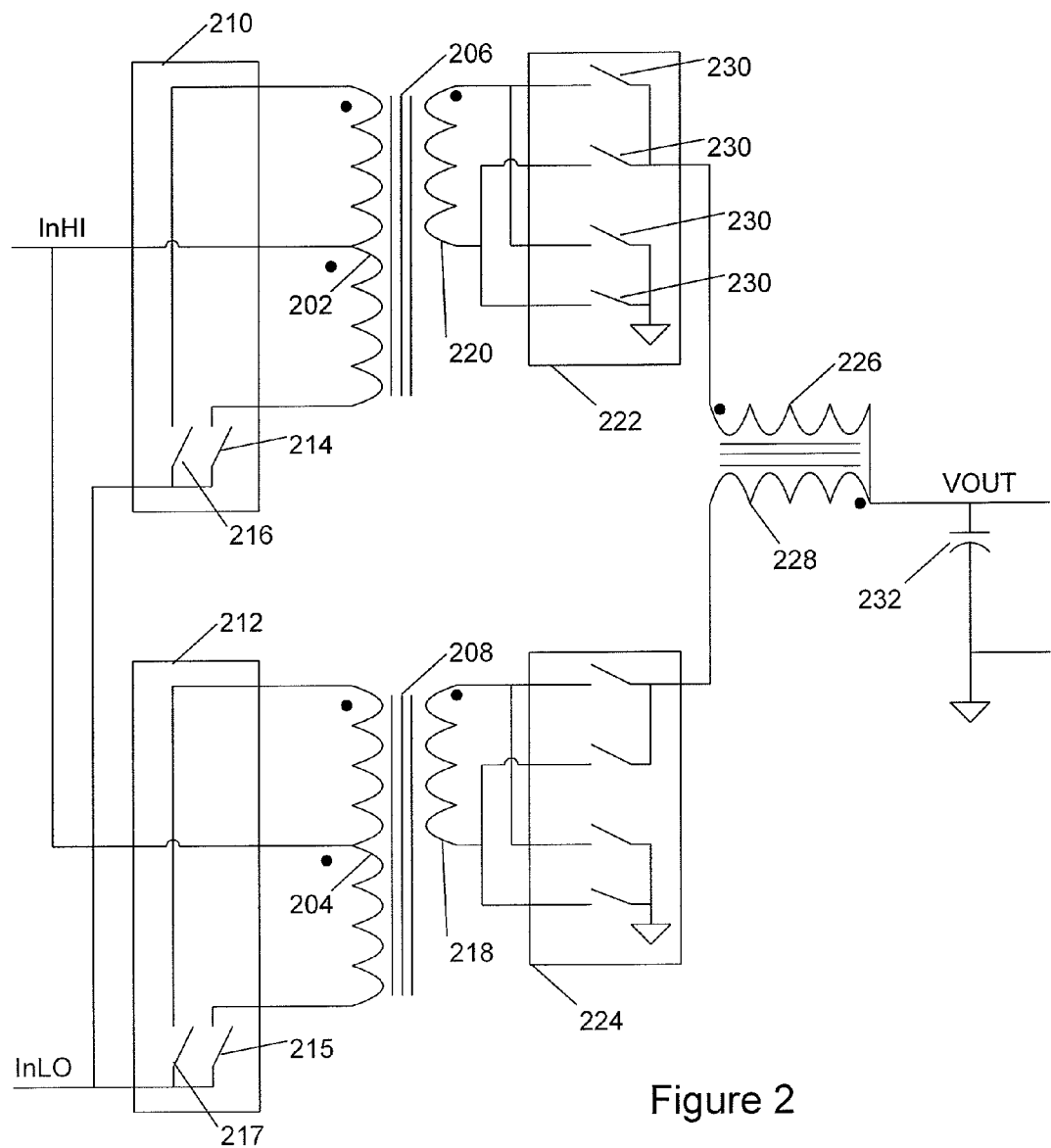
FIG. 2 is a simplified schematic diagram of a first implementation of the power converter.

FIG. 2 illustrates an embodiment having full-wave output rectification circuitry and push-pull, center-tapped, primary circuitry.

In this embodiment, a high voltage input InHI connects to a center tap of the primary winding 202, 204 of each isolation transformer 206, 208. Input switches 210, 212 each include switch transistors 214, 216, or 215, 217, which in an embodiment are NFET transistors, for selectively connecting end terminals of the primary winding 202, 204 to low voltage input InLO.

The secondary winding 218, 220 of each isolation transformer 206, 208, connects through rectification circuitry 222, 224 to output inductors 226, 228. In this embodiment, each rectification circuitry 222, 224 incorporates four switching devices 230 connected in a full-wave bridge rectifier configuration. In alternative embodiments switching devices 230 may be replaced by diodes. Output inductors 226, 228 are magnetically coupled, and together drive an output filter 232 to drive an output voltage VOUT. Output filter 232 incorporates at least one capacitor.

Figure 3:
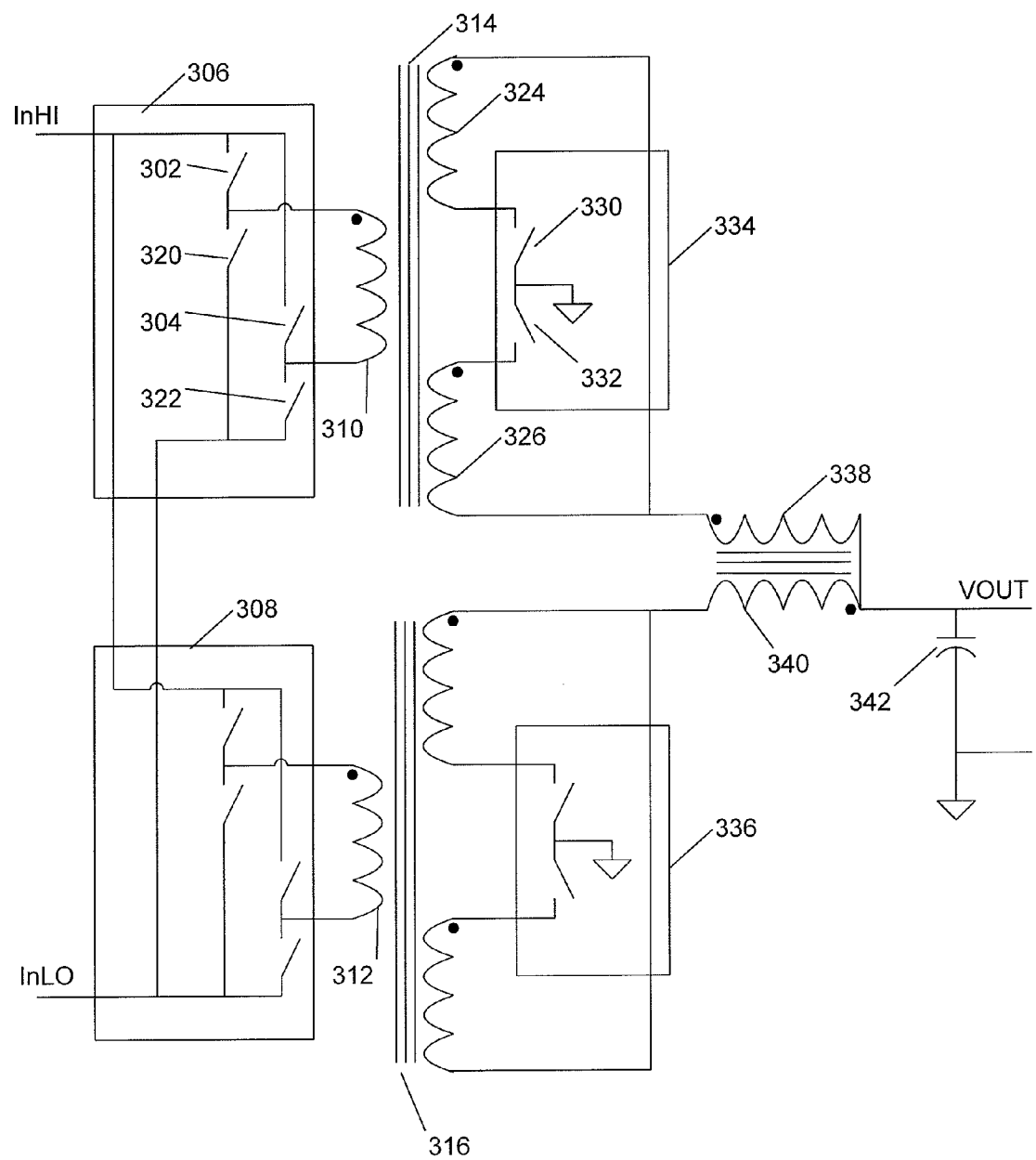
FIG. 3 is a simplified schematic diagram of a second implementation of the power converter.

FIG. 3 illustrates an embodiment having an equivalent of center-tapped output rectification circuitry with full "bridge" primary circuitry.

In the embodiment of FIG. 3, a high voltage input InHI connects alternately through high-drive switch transistors 302, 304 of input switches 306, 308 to an end of the primary winding 310, 312 of each isolation transformer 314, 316. Similarly, low voltage input InLO connects alternately through low-drive switch transistors 320, 322 to ends of the primary winding 310, 312 of the isolation transformers 314, 316.

An end of each secondary windings 324, 326 of each isolation transformer 314, 316, connects alternately through switching devices 330, 332 of rectification circuitry 334, 336 to ground, while the other end of each secondary winding 324, 326 connects to output inductors 338, 340. In alternative embodiments switching devices 330, 332 of the rectification circuitry 334, 336 may be replaced by diodes at some penalty in efficiency. Output inductors 338, 340 are magnetically coupled, and together drive a filter 342 to drive an output voltage VOUT.

The secondary circuitry of FIG. 3 is topologically equivalent in function to secondary circuitry having switching devices connected between ends of secondary windings 324, 326 and output inductor 328, with center tap connected to ground. The circuit as illustrated with switching devices coupling windings to ground allows easy use of NFET switch devices.

In each embodiment, additional components such as snubbing diodes, predriver, current sensing, and control circuitry may exist in each primary and secondary circuit and it is omitted from the drawings for clarity.

Figure 4:
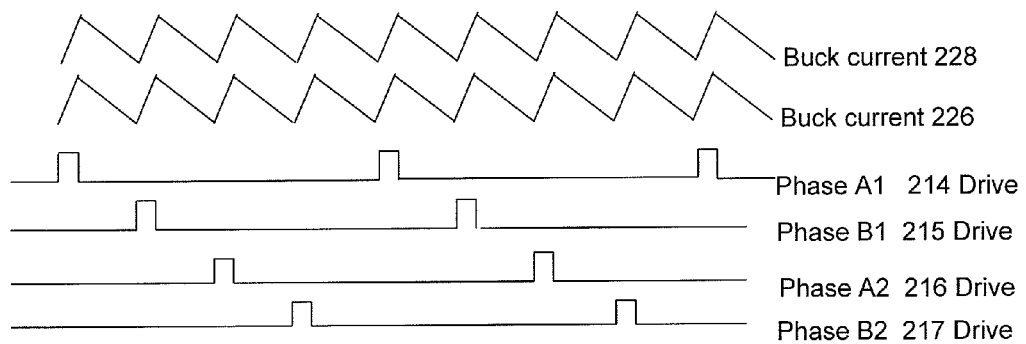
FIG. 4 is a timing diagram illustrating current in a magnetically coupled buck inductor of the converter.

During operation of the embodiment of FIG. 2, as illustrated in FIG. 4, the input switches 210, transformer 206, and rectification circuitry 222 are referred to as the phase-A half circuit, and input switch 212, transformer 208, and rectification circuitry 224 are referred to as the phase-B half circuit. In each cycle, switch transistor 214 of input switches 210 briefly drives its primary winding 202 end low, then switch transistor 215 of input switches 212 briefly drives its primary winding 204 end low. Next, switch transistor 216 of input switches 210 briefly drives its primary winding 202 end low, then switch transistor 217 of input switches 212 briefly drives its primary winding 204 end low. Induced currents in secondary windings, as directed by the rectification circuitry, drives current into the associated output inductor each time a primary winding end is driven low. Current in output inductor 226 or 228 as illustrated comes from its secondary winding when switch transistor 214 or 216 turns on, and is induced from the other coupled output inductor 228 when switch transistor 215 or 216 turns on. The net effect is to provide substantial current in both output inductors 226, 228 during each power pulse, regardless of whether the power pulse involved drive of phase-A transformer 206 or drive of phase-B transformer 208.

Switches 834 and 836 are typically driven in an alternating fashion. The same applies to switches 838 and 840. By coupling the inductors 826 and 828 to inductors 830 and 832, and by introducing a phase shift between the phase A (switches 814, 816, 834, 836) and phase B (switches 815, 817, 838, 840) the benefits of reduced current ripple can be achieved.

It is anticipated that the center-tapped primary circuitry of FIG. 2, may be combined with the center-tapped-equivalent secondary circuitry of FIG. 3; or the full-bridge primary circuitry of FIG. 3 may be combined with the full-bridge rectification secondary circuitry of FIG. 2.

Figure 5:
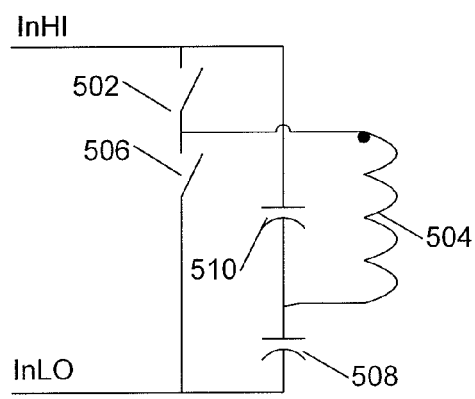
FIG. 5 is a simplified schematic diagram of an alternative embodiment of the primary circuit of the power converter.

In an alternative embodiment, as illustrated in FIG. 5, the primary portion of the converter uses a half-bridge configuration. The half-bridge configuration of FIG. 5 has a first switching device 502 for driving a first side of primary winding 504 of the transformer to a high input voltage InHI, and a second switching device 506 for driving the first side of primary winding 504 to InLO. The second side of primary winding 504 is connected to an effective AC ground through one 508 or two 510 capacitors. In the alternative embodiment, two or more primary circuits as illustrated in FIG. 5 are transformer-coupled to two or more secondary winding and secondary circuitry as illustrated in FIG. 2 or FIG. 3.

Figure 6:
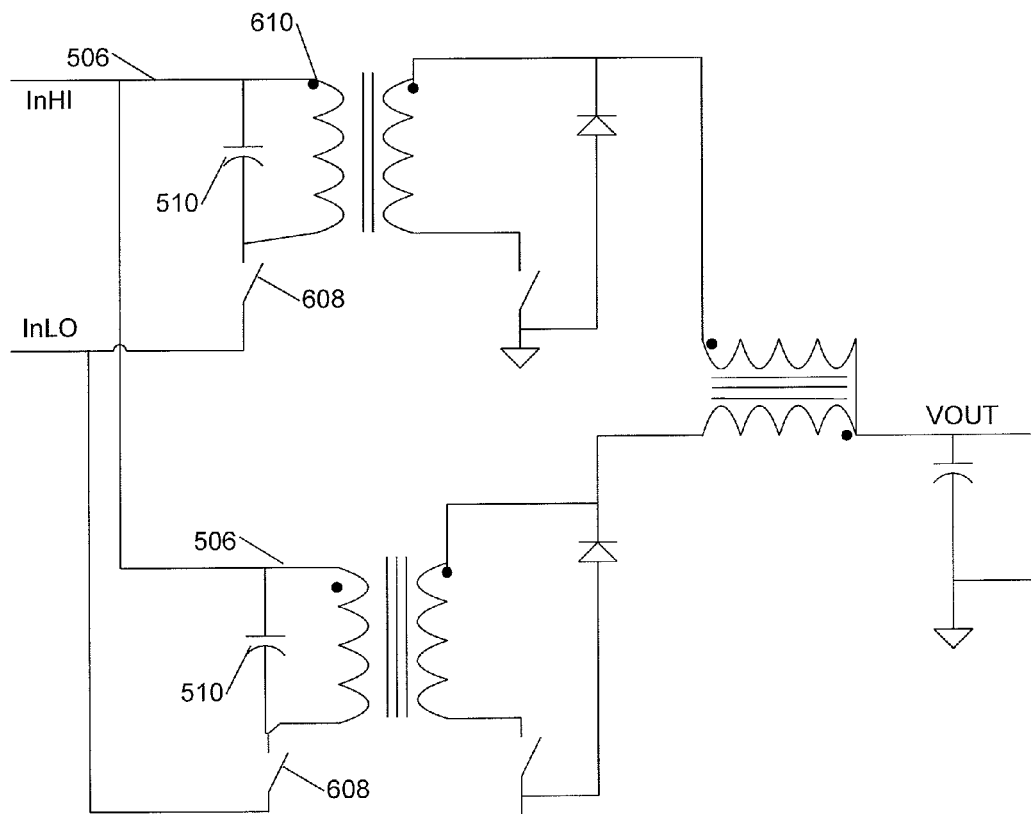
FIG. 6 is a simplified schematic diagram of yet another alternative embodiment of the power converter in forward configuration.

In yet another alternative embodiment, as illustrated in FIG. 6, the primary portion of the converter uses a forward configuration. The forward configuration of FIG. 6 has a single switching device 608 for driving a first side of primary winding 610 of the transformer to a low input voltage InLO, while a second side of primary winding 610 is tied to a high input voltage InHI. Transformer core reset circuitry is not shown for clarity. In this alternative embodiment, two or more primary circuits as illustrated in FIG. 6 are transformer-coupled to two or more secondary windings. Operation of the secondary circuit is discussed below with reference to FIG. 7.

Figure 7:
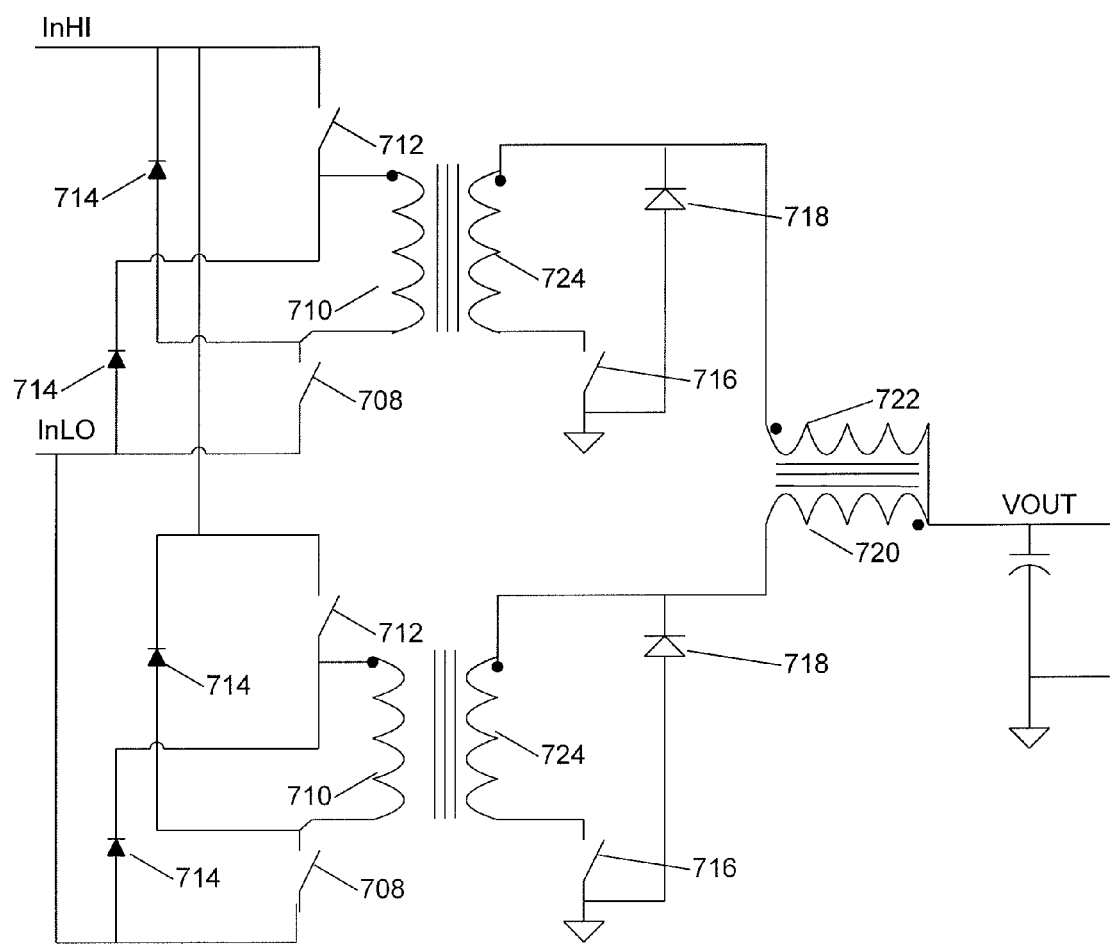
FIG. 7 is a simplified schematic diagram of still another alternative embodiment of the power converter in a variant of forward configuration.

In yet another alternative embodiment, as illustrated in FIG. 7, the primary portion of the converter uses an alternative forward configuration. The forward configuration of FIG. 7 has a switching device 708 for driving a first side of primary winding 710 of the transformer to a low input voltage InLO, while a second side of primary winding 710 is tied to a high input voltage InHI through a second switch 712. When this primary circuit is active, low and high switch devices 708, 712 together conduct current pulses, when low and high switch devices 708, 712 are off residual current is dissipated through diodes 714 providing transformer core reset. In this alternative embodiment, two or more primary circuits as illustrated in FIG. 7 are transformer-coupled to two or more secondary windings.

The secondary circuit of FIGS. 6 and 7 has a switch 716 coupled between a first side of the secondary winding 724 and ground, and a diode 718 coupled to bypass the opposite side of the secondary winding 724 to ground. Switch 716, which may be implemented as a diode, conducts during each power pulse to drive coupled output inductors 720 and 722. Diode 718, which may also be implemented as a switching device, of each phase conducts to allow current induced in an output inductor, such as inductor 720, by the power pulse of another phase driven into another output inductor, such as inductor 722.

Figure 8:
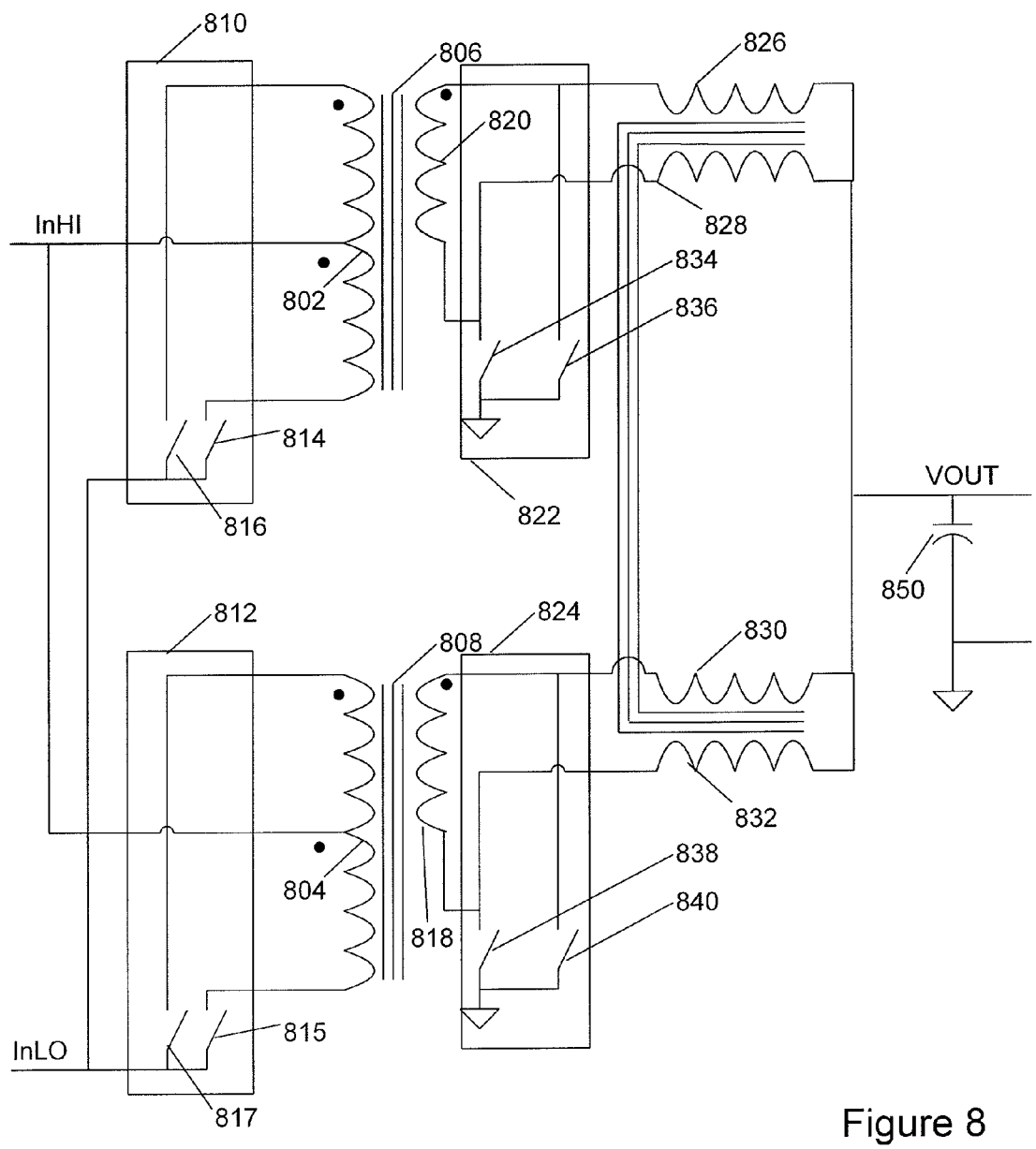
FIG. 8 is a simplified schematic diagram of still another alternative embodiment of the power converter having a current-doubler secondary circuit.

FIG. 8 illustrates an embodiment having push-pull, center-tapped, primary circuitry with current-doubler output rectification circuitry.

In this embodiment, high voltage input InHI connects to a center tap of the primary winding 802, 804 of each isolation transformer 806, 808. Input switches 810, 812 each include switch transistors 814, 816, or 815, 817, which in an embodiment are NFET transistors, for selectively connecting end terminals of the primary winding 802, 804 to low voltage input InLO. Input switches 810, 812 are driven by suitable driving and control logic to induce an alternating current in the secondary windings 818, 820 of each isolation transformer.

The secondary winding 818, 820 of each isolation transformer 806, 808, connects through rectification circuitry 822, 824 to output inductors 826, 828, 830, 832. In this embodiment, each rectification circuitry 822, 824 incorporates two switching devices 834, 836, 838, 840 connected in a current-doubler configuration. Signals of a first polarity at each secondary winding 818, 820 drive through a first of the switching devices 834, 838, to provide power between signal ground and, through a first output inductor 826, 830 into the load. Signals of alternate polarity at each secondary winding 818, 820 drive through a second of the switching devices 836, 840, to provide power between signal ground and, through a second output inductor 828, 832 of each pair into the load. Output inductors 826, 828, 830, 832 are magnetically coupled, in an embodiment all four are wound together on the same core, and together drive an output filter 850 to drive an output voltage VOUT. Output filter 850 incorporates at least one capacitor as in other embodiments herein described.

It is anticipated that embodiments of the multiphase DC-DC converter having magnetically coupled output inductors may have more than two phases. In particular, four phase embodiments having four sets of input switches, four transformers, and four coupled output inductors; and six phase embodiments having six sets of input switches, six transformers, and six coupled output inductors will function. The output inductors may be coupled in pairs as illustrated, all output inductors may be coupled, or the output inductors may be coupled in other arrangements. The circuits illustrated herein in FIGS. 1, 2, 3, 6, 7, and 8 illustrate two phases for simplicity and clarity.

Figure 9:
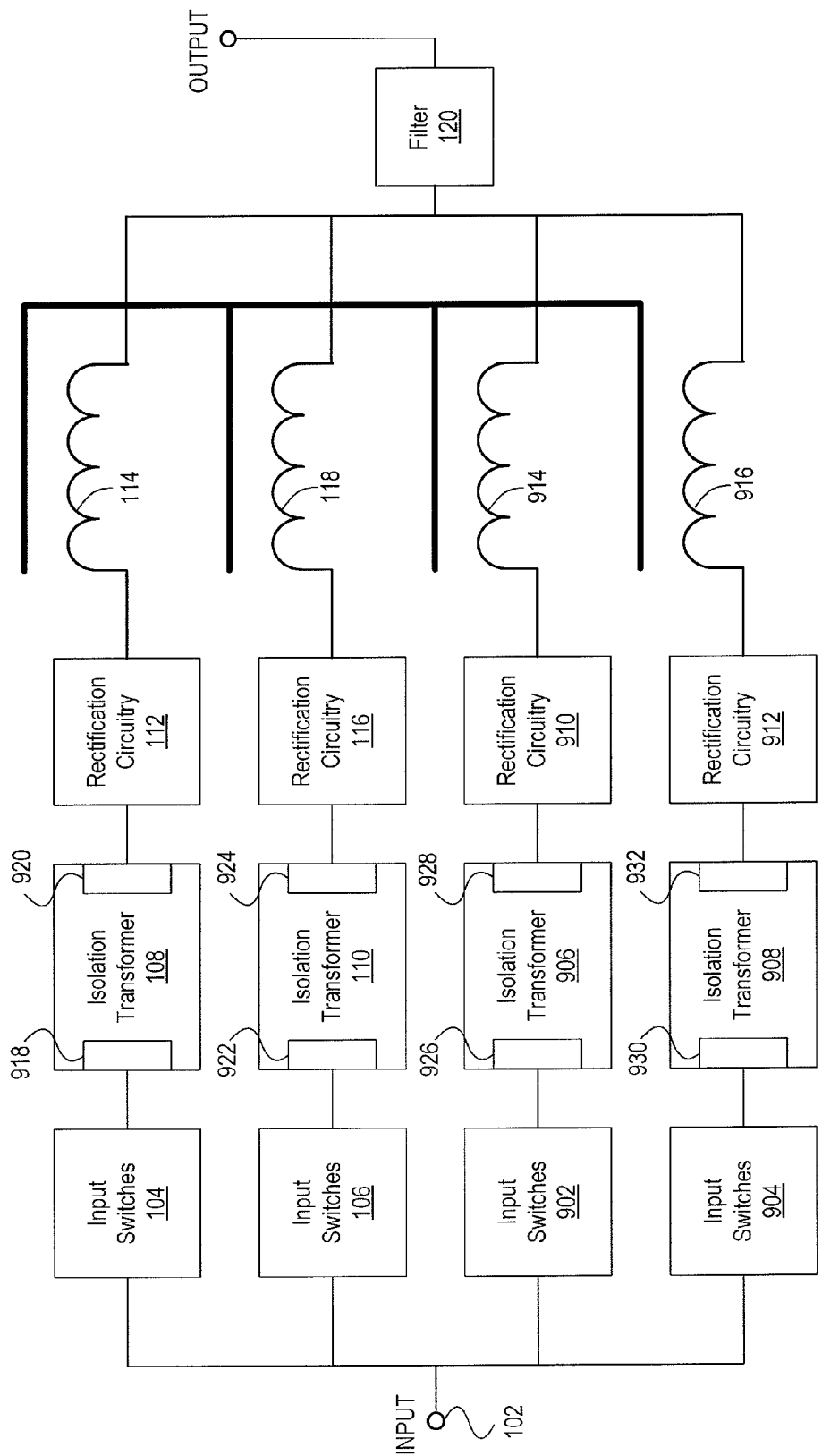
FIG. 9 is a block diagram of a power converter, according to an embodiment.

FIG. 9 illustrates a multiphase DC-to-DC power converter having four phases. Phase one includes input switches 104, isolation transformer 108, rectification circuitry 112, and output inductor 114. Phase two includes input switches 106, isolation transformer 110, rectification circuitry 116, and output inductor 118. Phase three includes input switches 902, isolation transformer 906, rectification circuitry 910, and output inductor 914. Phase four includes input switches 904, isolation transformer 908, rectification circuitry 912, and output inductor 916.

Isolation transformers 108, 110, 906, and 908 include primary windings 918, 922, 926, and 930, respectively; isolation transformers 108, 110, 906, and 908 also include secondary windings 920, 924, 928, and 932, respectively. Output inductors 114, 118, 914, and 916, which are magnetically coupled, are connected to filter 120.

For purposes of this document, the term "magnetically coupled" with reference to inductors shall mean inductors having a coupling coefficient σ greater than or equal to 3, where $\sigma = Lm/L_1$ as defined in column 8 of U.S. Pat. No. 6,362,986 to Shultz, et al.

While the invention has been particularly shown and described with reference to particular embodiments thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. A multiphase DC-to-DC power converter, comprising:
    at least two sets of input switches, each set of input switches generating a primary current waveform from an input power source, each primary current waveform having a time varying component that is displaced in phase from a time varying component of each other primary current waveform;
    an isolation transformer for each set of input switches, each isolation transformer connecting to one set of input switches and transforming the respective primary current waveform into a secondary current waveform;
    a rectification circuit for each isolation transformer, each rectification circuit connecting to one isolation transformer and rectifying the respective secondary current waveform;
    a common filter providing an output voltage node; and
    at least one output inductor for each rectification circuit, each output inductor connecting to one rectification circuit and coupling the rectified secondary current waveform to the common filter to drive an output voltage, at least two of the output inductors being magnetically coupled such that current through one magnetically coupled output inductor induces current through all other magnetically coupled output inductors.

2. The multiphase DC-to-DC power converter of claim 1, at least one set of input switches and its respective isolation transformer collectively forming a push-pull, center-tapped primary circuit.

3. The multiphase DC-to-DC power converter of claim 1, at least one set of input switches and its respective isolation transformer collectively forming a full-bridge primary circuit.

4. The multiphase DC-to-DC power converter of claim 1, at least one set of input switches and its respective isolation transformer collectively forming a half-bridge primary circuit.

5. The multiphase DC-to-DC power converter of claim 1, at least one set of input switches and its respective isolation transformer collectively forming a forward converter primary circuit.

6. The multiphase DC-to-DC power converter of claim 1, at least one rectification circuit being a full-wave output rectification circuit.

7. The multiphase DC-to-DC power converter of claim 1, at least one rectification circuit being a center-tapped output rectification circuit.

8. The multiphase DC-to-DC power converter of claim 1, at least two rectification circuits and their respective output inductors collectively forming a current-doubler output rectification circuit.

9. A multiphase DC-to-DC power converter, comprising:
    a plurality of electrical circuits for providing rectified current waveforms to respective rectification output nodes, each electrical circuit generating its respective rectified current waveform from a common input power source, each rectified current waveform having a time varying component displaced in phase from the time varying component of each other rectified current waveform, each electrical circuit including a transformer providing at least one of electrical isolation and voltage magnitude transformation between the input power source and the respective rectification output node;

a common filter providing an output voltage node; and at least one output inductor for each electrical circuit, each output inductor electrically coupling one rectified current waveform to the common filter to drive an output voltage, at least two of the output inductors being magnetically coupled so that current through one magnetically coupled output inductor induces current through all other magnetically coupled output inductors.

10. The multiphase DC-to-DC power converter of claim 9, at least one the electrical circuits including a push-pull, center-tapped primary circuit and a full-wave output rectification circuit.

11. The multiphase DC-to-DC power converter of claim 9, at least one of the electrical circuits including a full-bridge primary circuit and a center-tapped output rectification circuit.

12. The multiphase DC-to-DC power converter of claim 9, at least one of the electrical circuits including a center-tapped primary circuit and a center-tapped output rectification circuit.

13. The multiphase DC-to-DC power converter of claim 9, at least one of the electrical circuits including a full-bridge primary circuit and a full-wave output rectification circuit.

14. The multiphase DC-to-DC power converter of claim 9, at least one of the electrical circuits including a half-bridge primary circuit.

15. The multiphase DC-to-DC power converter of claim 9, at least one of the electrical circuits including a forward converter primary circuit.

16. The multiphase DC-to-DC power converter of claim 9, at least two of the electrical circuits including push-pull, center-tapped primary circuits, the at least two electrical circuits collectively forming a current-doubler output rectification circuit.

17. A method of generating an output voltage from an input voltage source, comprising:

generating a least two primary current waveforms from the input voltage source, each primary current waveform having a time varying component that is displaced in phase from the time varying component of each other primary current waveform;

transforming each primary current waveform into a secondary current waveform using an isolation transformer;

rectifying each secondary current waveform; and transmitting each rectified secondary current waveform through an output inductor to a common filter to produce the output voltage, at least two of the output inductors being magnetically coupled so that current through one magnetically coupled output inductor induces current through all other magnetically coupled output inductors.

18. The method of claim 17, the steps of generating and transforming comprising using at least one push-pull, center-tapped primary circuit.

19. The method of claim 17, the steps of generating and transforming comprising using at least one full bridge primary circuit.

20. The method of claim 17, the steps of generating and transforming comprising using at least one half bridge primary circuit.

21. The method of claim 17, the steps of generating and transforming comprising using at least one forward converter primary circuit.

22. The method of claim 17, the step of rectifying comprising using at least one full-wave output rectification circuit.

23. The method of claim 17, the step of rectifying comprising using at least one center-tapped output rectification circuit.

24. The method of claim 17, the steps of rectifying and transmitting comprising using a current-doubler output rectification circuit.

* * * * *